(12) United States Patent
Louie

(10) Patent No.: US 7,636,921 B2
(45) Date of Patent: Dec. 22, 2009

(54) SOFTWARE AND METHODS FOR PREVIEWING PARAMETER CHANGES FOR A GRAPHICS DISPLAY DRIVER

(75) Inventor: Wayne C. Louie, Uxbridge (CA)

(73) Assignee: ATI Technologies Inc., Markham, Ontario (CA)

( * ) Notice: Subject to any disclaimer, the term of this patent is extended or adjusted under 35 U.S.C. 154(b) by 520 days.

(21) Appl. No.: 10/930,826

(22) Filed: Sep. 1, 2004

(65) Prior Publication Data

US 2006/0080677 A1 Apr. 13, 2006

(51) Int. Cl.
*G06F 3/00* (2006.01)
*G06F 9/44* (2006.01)
*G06F 9/46* (2006.01)
*G06F 13/00* (2006.01)
*G06F 3/048* (2006.01)
*G09G 5/00* (2006.01)

(52) U.S. Cl. .................. 719/323; 719/321; 715/777; 345/520; 345/619

(58) Field of Classification Search .............. 719/323, 719/327–328, 321; 715/274, 700, 764–777; 345/520, 619
See application file for complete search history.

(56) References Cited

U.S. PATENT DOCUMENTS

| | | | |
|---|---|---|---|
| 5,734,852 A | 3/1998 | Zias et al. | |
| 6,771,269 B1* | 8/2004 | Radecki et al. | 345/503 |
| 6,892,359 B1* | 5/2005 | Nason et al. | 715/788 |
| 6,901,580 B2* | 5/2005 | Iwanojko et al. | 717/121 |
| 6,982,729 B1* | 1/2006 | Lange et al. | 345/660 |
| 2002/0059338 A1* | 5/2002 | Nishikawa et al. | 707/500 |
| 2002/0067508 A1* | 6/2002 | Nishikawa et al. | 358/1.18 |
| 2003/0103081 A1* | 6/2003 | Ebuchi | 345/764 |
| 2003/0103221 A1* | 6/2003 | Natori | 358/1.9 |
| 2003/0189597 A1* | 10/2003 | Anderson et al. | 345/778 |
| 2003/0200361 A1* | 10/2003 | Dogra et al. | 710/8 |
| 2003/0200427 A1* | 10/2003 | Kemp et al. | 713/1 |
| 2004/0008217 A1* | 1/2004 | Livingston | 345/700 |
| 2004/0049741 A1* | 3/2004 | Natori | 715/527 |
| 2004/0066414 A1* | 4/2004 | Czerwinski et al. | 345/781 |
| 2004/0085310 A1 | 5/2004 | Snuffer | |
| 2004/0088654 A1* | 5/2004 | Uotani | 715/526 |
| 2004/0109203 A1* | 6/2004 | Kriss | 358/2.1 |
| 2005/0198236 A1* | 9/2005 | Byers et al. | 709/222 |
| 2006/0080677 A1* | 4/2006 | Louie | 719/323 |

OTHER PUBLICATIONS

Bob Newman:: Realtime data-driven web-based software development ; http://eqinfo.ucsd.edu/~rnewman/howtos/miscell/nview_horizontal_span.php ; p. 3-11 ; 2003.*

(Continued)

*Primary Examiner*—Hyung S Sough
*Assistant Examiner*—Qing-Yuan Wu

(57) ABSTRACT

Software for dynamically previewing changes to hardware driver settings for a graphics adapter is disclosed. Changes to the driver settings are dynamically previewed by forcing an executable graphics program module to load hardware parameter settings as changed, and drawing a region reflecting the changes using the executable graphics program library. The graphics program module may be forced to load new settings as a result of being newly instantiated. Conveniently, a preview region reflecting changes may be drawn in place of an already existing preview region.

16 Claims, 11 Drawing Sheets

OTHER PUBLICATIONS

Windows XP display properties, Oct. 25, 2001, Figs. 1-3.*
Mohr, A. and M. Gleicher, "Non-Invasive, Interactive, Stylized Rendering", Proceedings of the 2001 ACM Symposium on Interactive 3D Graphics, Mar. 19, 2001, pp. 175-178, ACM, New York, NY.
"Tutorial: Windows Display Properties", Adaptive Technology Research Center, Dec. 26, 2002, http://web.archive.org/web/20021226235753/http://www.utoronto.ca/atrc/tutorials/tut-winprop.html, Accessed: Jul. 31, 2007.
Lennil, P., "Demystifying the OS/2 Presentation Manager", OS/2 Developer, Sep. 1993, pp. 70-79, vol. 5, No. 4.
European Search Report for European Patent Application No. Ep 05255219.7, filed Aug. 25, 2005, EPO Form 1503 03.82 (P04C01), The Hague.
"Direct X", 2004, Microsoft Corporation, http://msdn.microsoft.com/directx, Accessed: Sep. 13, 2004.
"OpenGL", 2004, Silicon Graphics Inc., http://www.opengl.org/, Accessed: Sep. 13, 2004.
"GDI Device Contexts", 2004, Microsoft Corporation, http://msdn.microsoft.com/library/default.asp?url=/library/en-us/gdi/devcons_8x45.asp, Accessed: Apr. 26, 2005.

* cited by examiner

SOFTWARE AND METHODS FOR PREVIEWING PARAMETER CHANGES FOR A GRAPHICS DISPLAY DRIVER

FIELD OF THE INVENTION

The present invention relates generally to computer software, and more particularly to software for controlling and previewing the setting of hardware driver parameters.

BACKGROUND OF THE INVENTION

Today, computer operating systems commonly used on personal and enterprise computing devices use several layers of abstraction to allow software to execute consistently on any number of different computer hardware configurations. To achieve this, operating system components and applications are organized in layers. Software in each layer communicates with software in layers above and below it. Higher layers provide increasing degrees of abstraction, ending with the application program used by a user.

Conveniently, application programs need not communicate with hardware directly, and need only communicate with the operating system, or special purpose software modules and other applications which ultimately communicate with the operating system. The operating system, in turn communicates with lower level layers to cause hardware to act as requested by the application programs.

Device driver software, on the other hand, is software typically used by the operating system to provide a software interface to a particular hardware device. Device driver software functions as an abstraction layer isolating the details of how hardware operates from the operating system and application programs, thereby increasing the portability of higher level programs and libraries. This form of abstraction allows applications and operating systems to be utilized with many different hardware devices without modification provided a driver compatible with the particular hardware device is available.

This layered approach provides numerous benefits; it simplifies the creation of applications by programmers; it allows software to operate nearly identically using a multitude of hardware; and it facilitates upgrades to drivers and the operating system.

At the same time, programmers are constrained somewhat by the hardware access supported by the operating system.

The current Microsoft Windows™ programming environment, in particular, allows only certain parameters of graphics adapter drivers to be changed using the available graphics driver application programmer interface ("API"). As well, changes to driver parameter settings do not affect application settings dynamically. Instead, changes in driver parameters are typically only recognized as a consequence of certain events.

This, in turn, does not allow an end-user to preview changes to certain driver parameters before these are committed to all applications.

Accordingly, a method of dynamically previewing changes in certain hardware driver parameter settings, and an application allowing their preview are needed.

SUMMARY OF THE INVENTION

Changes to driver settings may be dynamically previewed by forcing an executable graphics program module to load hardware parameter settings as changed, and drawing a region using the executable graphics program library reflecting the changes.

Specifically, in accordance with an aspect of the present invention, a method of graphically previewing changes to hardware driver parameters in a graphical computing environment, includes (i) forcing an executable graphics program module to load hardware driver parameter settings; (ii) drawing a first preview region using the executable graphics program module; (iii) receiving user input indicating changes to the hardware driver parameter settings from initial settings to changed settings; (iv) altering the hardware driver parameter settings to reflect the changed settings; (v) creating a further instance of the executable graphics program module, and forcing the further instance of the executable graphics program module to load the hardware parameter settings as changed; and (vi) drawing a second preview region in place of the first preview region, using the further instance of the executable graphics program module, the second preview region reflective of the changed settings and thereby graphically previewing the changed settings in the second preview region; (vii) altering the hardware driver parameter settings to the initial settings, after the drawing a second preview region, so that other applications are unaffected by the changed settings to the hardware driver parameter settings.

Other aspects and features of the present invention will become apparent to those of ordinary skill In the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
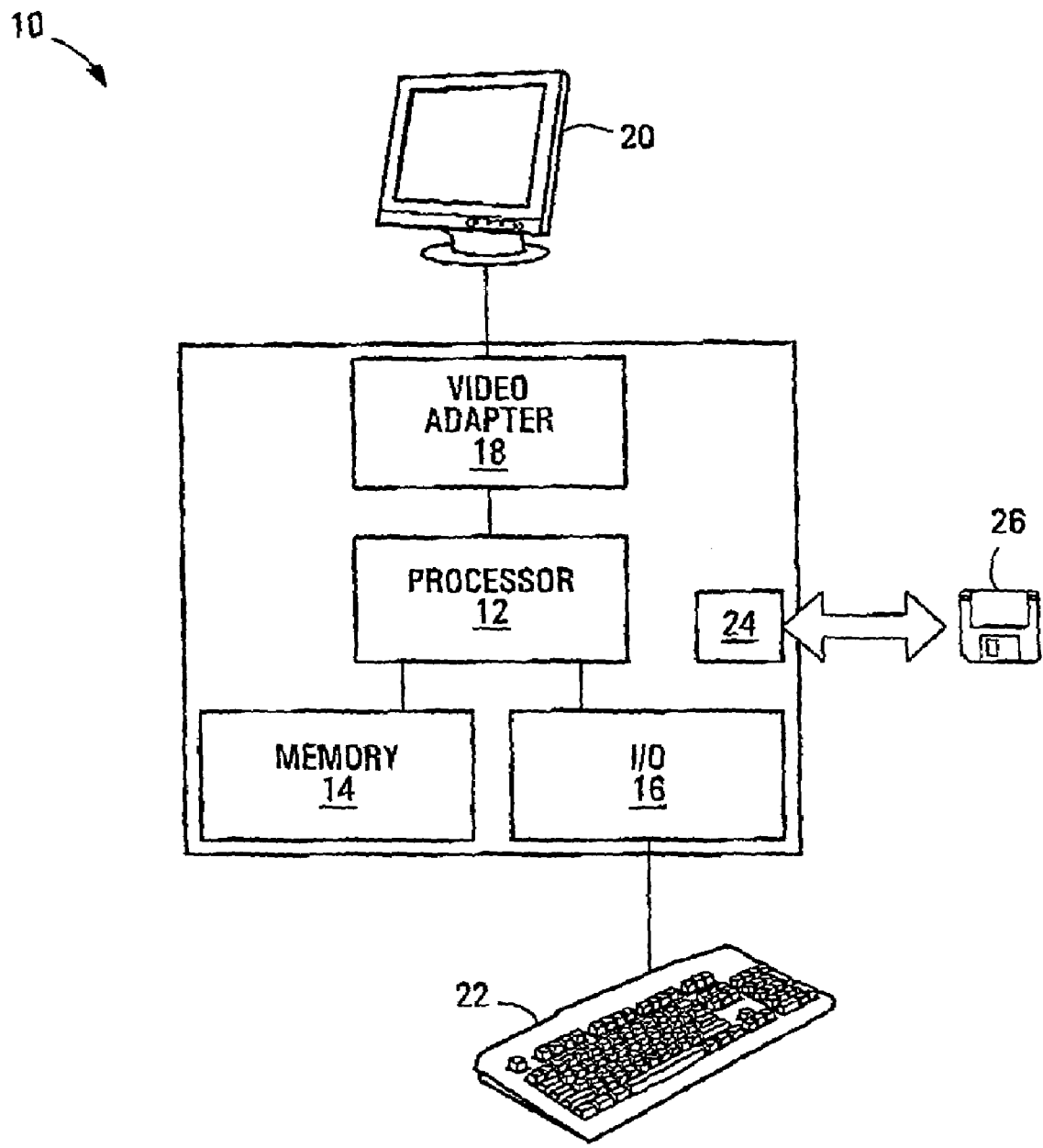
FIG. 1 is a schematic block diagram of a computing device, exemplary of an embodiment of the present invention.

FIG. 1 illustrates a computing device 10 including software, adapting device 10 to operate in manners exemplary of embodiments of the present invention. Device 10 is a conventional computing device, executing a conventional operating system providing a graphical computing environment, and applications that make use of the operating system and graphical operating environment, as detailed below. Device 10 includes a processor 12 in communication with computer memory 14, input/output interface 16, video adapter 18 and display 20. Device 10 may optionally include peripheral devices such as keyboard 22, disk drive 24, mouse (not shown) and the like. As well, device 10 may include one or more network interfaces and other computer peripherals known to those of ordinary skill.

In the depicted embodiment, computing device 10 executes a Microsoft Windows™ operating system. For example, device 10 may execute Windows™ XP; Windows™ NT 4.0; Windows™ ME: Windows™ 98, Windows™ 2000; or Windows™ 95. As such, processor 12 is a conventional central processing unit and may for example be a microprocessor compatible with the INTEL™ x86 family of microprocessors. In the depicted embodiment, video adapter 18 is a video adapter including a graphics processor made available by ATI Technologies, Inc., in association with the RADEON trademark. Computer memory 14 includes a suitable combination of random access memory, read-only memory and disk storage memory, used by device 10 to store and execute operating system and application software programs adapting device 10 in manners exemplary of the embodiments of the present invention. Exemplary software could, for example, be stored in read-only memory or loaded from an external peripheral such as drive 24, capable of reading and writing data to or from a computer readable medium 26 used to store software to be loaded into memory 14. Computer readable medium 26 may be an optical storage medium, a magnetic diskette, tape, ROM cartridge or the like.

Figure 2:
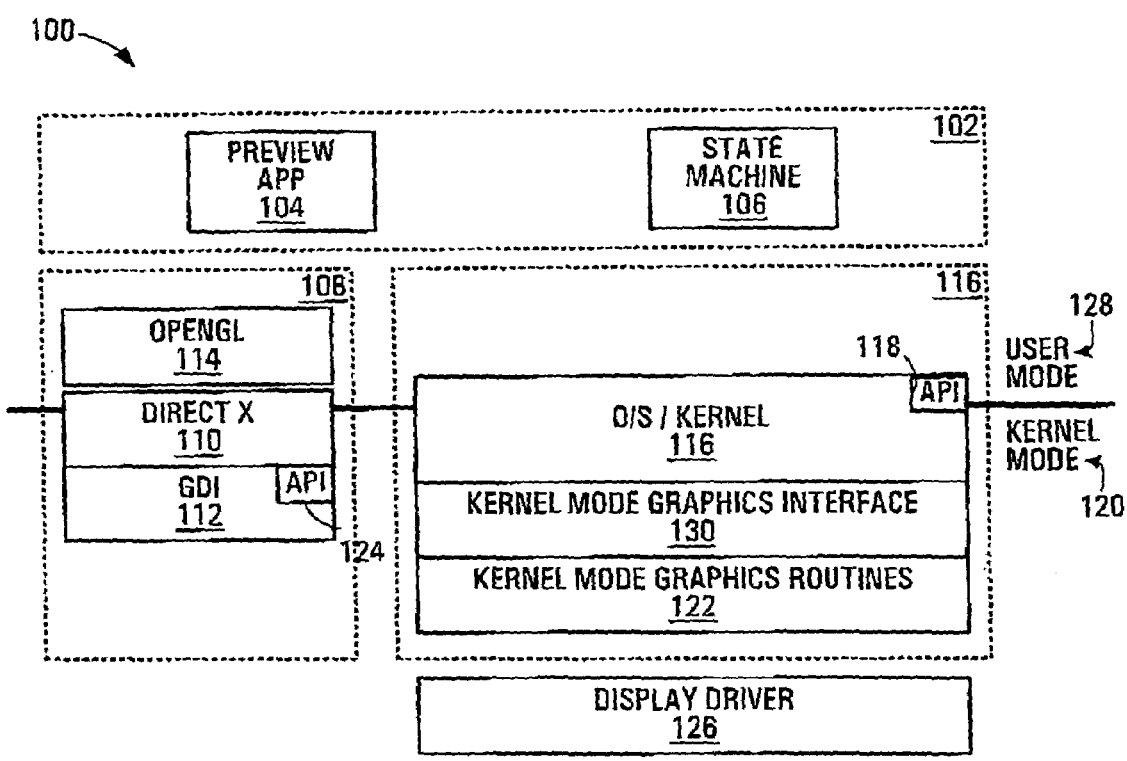
FIG. 2 is a block diagram of software components stored and executed at the device of FIG. 1, FIGS. 3-4 are flow charts of exemplary software blocks at the device of FIG. 1.

Selected components of software 100 stored within memory 14 during execution are illustrated in FIG. 2. Software 100 includes application software 102; executable graphics program modules 108; operating system 116; and display driver 126. As illustrated, the arrangement of application software 102 and operating system 116 is layered. In this architecture, layers with higher levels of abstraction can utilize the software routines provided by layers implemented below them which provide more specificity to implement certain services.

Software 100 takes advantage of hardware memory protection features of processor 12. As such, depicted software components when executed by processor 12 execute in one of two processor modes. One mode (referred to in the Windows™ programming environment as "user mode" or "Ring 3") has access to limited CPU memory address spaces. The other mode (referred to as "kernel mode" or "protected mode" or "Ring 0") has uninhibited access to the CPU memory address space, and hardware devices. For ease of illustration, software executing in user and kernel mode are delineated in FIG. 2. As illustrated, certain portions of operating system 116 are executed in kernel mode. Application software 102, certain modules 108 and portions of operating system 116 executed in user mode and make use of portions of the operating system 116 executing in kernel mode. Applications may gain access to protected hardware and memory by making appropriate operating system calls, using the operating system API 118 or calls to program modules (like program modules 108) executing in kernel mode. In response, software executing in kernel mode makes the restricted memory/hardware access.

Executable graphics program modules 108 may, for example, be user or kernel mode graphics libraries, and may be dynamically linked libraries linked to individual applications of application software 116, as required. Example graphics modules 108 may include Microsoft's DirectX library 110, Microsoft's Graphics Driver Interface (GDI) library 112, or the OpenGL library 114. For user mode libraries, complementary kernel mode graphics routines 122 to the user mode libraries (possible in the form of loadable modules) may be accessible through kernel mode graphics interface 130. As will be appreciated, graphics program modules 108 provide data structures and routines that facilitate the presentation of certain graphics by video adapter 18.

For example, the DirectX library 110 contains Microsoft's own graphics libraries providing a low-level API that provides user-mode media interfaces for games and other high-performance multimedia applications. DirectX library 110 is a thin layer, providing direct access to hardware services, and takes advantage of available hardware graphics accelerators and emulates accelerator features when accelerators are not present. In the existing Windows™ environment, the DirectX includes user mode and kernel portions. For simplicity only a single DirectX library 110 is depicted.

GDI library 112 provides a GDI API 124 allowing user applications to present basic, typically two-dimensional, graphical displays using low level hardware, such as a video adapter 18.

The OpenGL library 114 (originally created by SGI) abstracts 3D operations such as projections, lighting, rendering, texturing, matrix operations, etc, making it easy for developers to produce high quality 3D applications. In the existing Windows environment, OpenGL library 114 is a user mode dynamically linked library.

Of course, the execution of graphics modules such as libraries 110, 112 and 114 and counterpart modules in kernel mode graphics routines 122 in user and kernel modes is somewhat arbitrary, and depends on operating system and library design. It therefore need not be as described. For example, the location of graphic libraries may change depending on the type or version of the operating system 116.

OpenGL, DirectX and GDI libraries 114, 110 and 112, in turn communicate directly or through complementary kernel mode graphics routines 122, with display driver 126 to manipulate graphics hardware. Application software 102 directs output to a specified device, such as video adapter 18, by creating an instance of a data structure referred to as a device context (DC) for the device. A device context is a data structure managed by operating system 116, containing information about the device, such as its operating modes and device settings. DCs facilitate access to hardware by providing a fairly uniform interface to numerous types of hardware. DCs may be created through operating system 116. For example, the Windows™ call User32API.GetDC may be used to create a device context.

A user application, such as a preview application 104, or another application creates one or more device contexts. Typically, operating system 116 returns a DC handle, which is used in subsequent user application calls to identify the device. For example, using the handle, an application can retrieve information about the capabilities of the device, such as its technology type (display, printer, or other device) and the dimensions and resolution of the display surface.

Other graphics modules 108 (such as the OpenGL and DirectX libraries 114, 110) may similarly use contexts managed by kernel 116 in order to write their outputs to windows and devices associated with the contexts. Again, contexts are identified by their handle, and written to by the libraries.

Operating system 116 creates an instance of a display driver 126 for each logical display that is currently active. Operating system 116 uses the concept of a logical display to represent a screen in order to accommodate the ability of certain modern graphics adapters to handle multiple displays. Having an instance of a display driver 126 associated with a logical display/screen advantageously allows each screen to have different properties because each instance of the display driver 126 can have different properties.

Similarly, behaviour of each of executable graphics program modules 108 and driver 126 may be controlled through certain driver parameter settings. Driver parameter settings used by each of modules 108 will vary depending on the value of the driver parameters and how they are interpreted. For many modules, such as libraries 110, 112 and 144, many driver parameters are read from persistent memory when the libraries are first loaded from persistent storage memory. These parameters can typically not be varied thereafter. Other driver parameters are exposed to the operating system and their settings may be changed after a library has loaded. Known operating system calls, in turn, are used to manipulate such exposed driver parameter settings.

Driver parameters include parameters used by the display driver 126 when rendering graphics. Specific driver parameters include 3-D graphics settings such as whether anti-aliasing should be used when an image is rendered, 3-D anti-isotropic filter parameters: texture mapping preferences; shading preferences: brightness settings, texture rendering detail levels, and the like. The display driver parameter settings typically dictate how modules 108 interact with display driver 126 and how display driver 126 interfaces with video adapter 18. The settings may be used to influence how the software embodied in display driver 126 behaves, or how video adapter 18 is configured.

For the Windows operating system, driver parameter settings are stored within the operating system registry. Different modules treat driver parameters differently. Some graphics libraries (e.g. GDI and DirectX libraries 110, 112) load driver parameter settings from the registry in very few circumstances. Many driver parameter settings are loaded upon the initial load of the driver libraries; and driver mode change requests. Other driver parameters are loaded each time a DC or surface (i.e. window) is created, using an already loaded module. Newly created contexts created with most existing dynamically linked libraries thus typically inherit most driver parameter values as stored upon initial load of the dynamically linked library.

Exemplary of an embodiment of the present invention, a preview application 104 forces tentative changes to driver parameter settings to be loaded, and creates a surface reflecting the tentative driver parameter changes. In the preferred embodiment, changed driver parameter settings are loaded by spawning a new application, and creating a new instance of OpenGL library 114 for that application. The new instance of the OpenGL library 114 reads (or inherits) changed parameter values from the registry. A surface may be created using the newly loaded instance of the library. After drawing the surface, existing driver parameter settings are restored so that other applications that create new instances of the OpenGL library (and might thus be affected by the tentative driver parameter setting changes) are not affected by the parameter changes.

Figure 3:
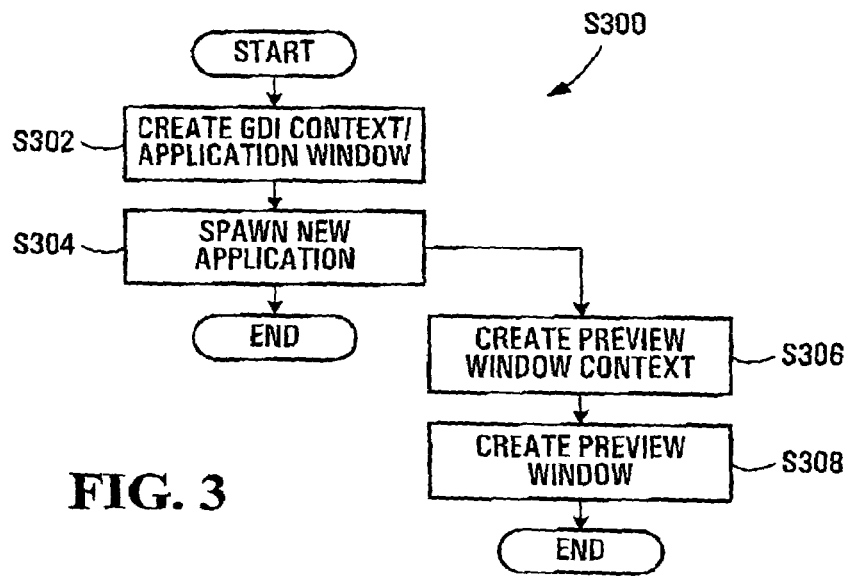

Specifically, as illustrated in FIG. 3, software block S300 of preview application 104 initially creates a display area in the form of an application window 50 functioning as an end-user interface. An exemplary application window 50 is depicted in FIGS. 5A-5G. Application window 50 is created by the preview application 104 by creating a device context using GDI library 112 and a 2-D surface (i.e. window 50) in block S302. Driver parameter settings used in the application window 50 by the preview application 104 are inherited from the driver parameter settings initially loaded when library 112 is loaded for the first time. That is, driver parameters that affect how window 50 is drawn are inherited, and reflected in the drawn window 50.

As illustrated in FIGS. 5A-5H, application window 50 may include a plurality of graphical user interface controls, such as tick boxes 54, list boxes 58, radio buttons, combo boxes, sliders 56 (see FIG. 5A) for accepting user inputs to vary driver parameter settings.

A first preview region 52, in the form of a 3-D surface or window, depicting a graphic illustrating applied driver parameter setting changes is also contained within window 50. Although contained within application window 50, first preview region 52 is a window that is separate from application window 50. First preview region 52 is created by its own application (i.e. an application having its own process ID). As such, a new application is spawned in block S304 and a device context for first preview region 52 is created by the newly spawned application in block S306 by creating a device context defined using a 3-D graphics library. As will be appreciated, new applications may be created. In block S308, a surface is created using 3-D graphics library and the device context. In the depicted embodiment, the OpenGL library 114 is used to create preview region 52. As will be appreciated, as a result of spawning a new application the OpenGL library 114 will be loaded/instantiated upon initial creation of a surface using the OpenGL library. Upon loading the OpenGL library, all driver parameter settings as stored within the registry will be inherited. Unlike many other libraries, an instance of the OpenGL library 114 is created the first time an application linked to the OpenGL library draws a surface using OpenGL library 114.

So that first preview region 52 appears as part of application window 50, its coordinates are fixed relative to the co-ordinates of application window 50. Thus, first preview region 52 is initially created by querying the co-ordinates of application window 50 in blocks S304/306. The coordinate of region 52 are calculated relative to the queried co-ordinates. If application window 50 is moved and re-drawn, first preview region 52 is moved and redrawn with it.

Figure 4:
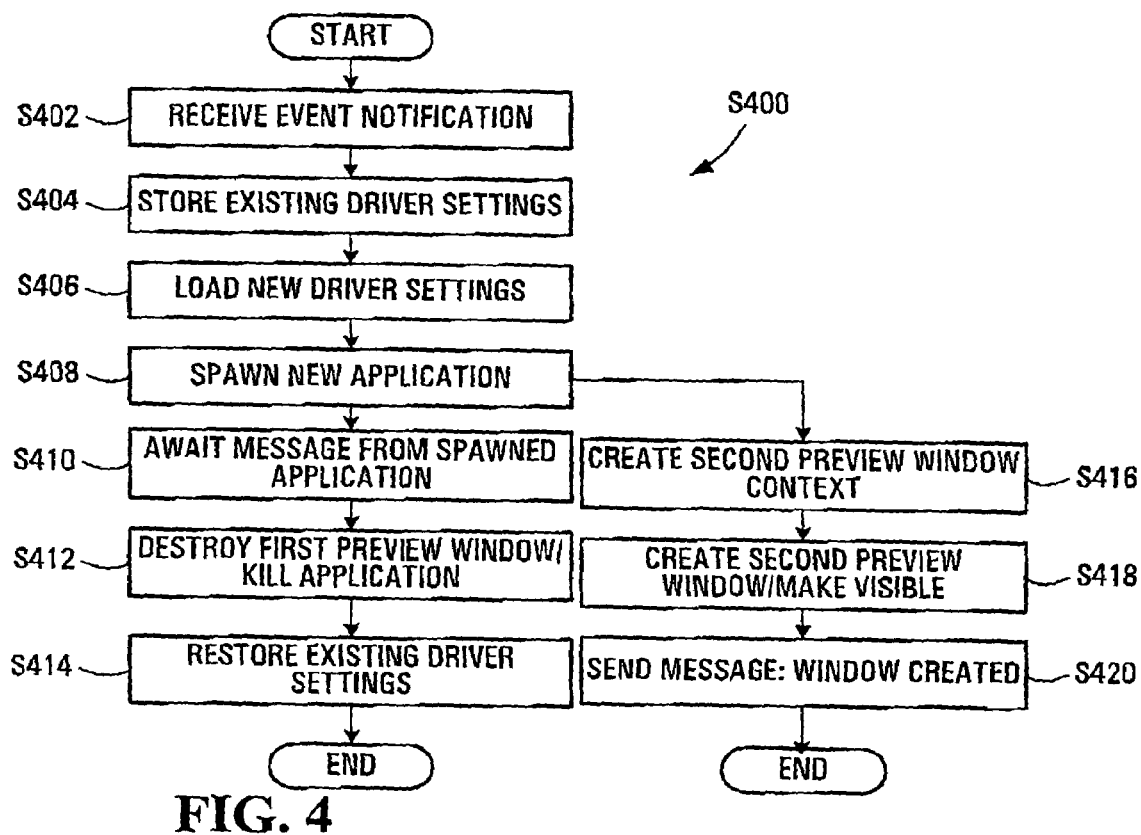
Figure 5A:
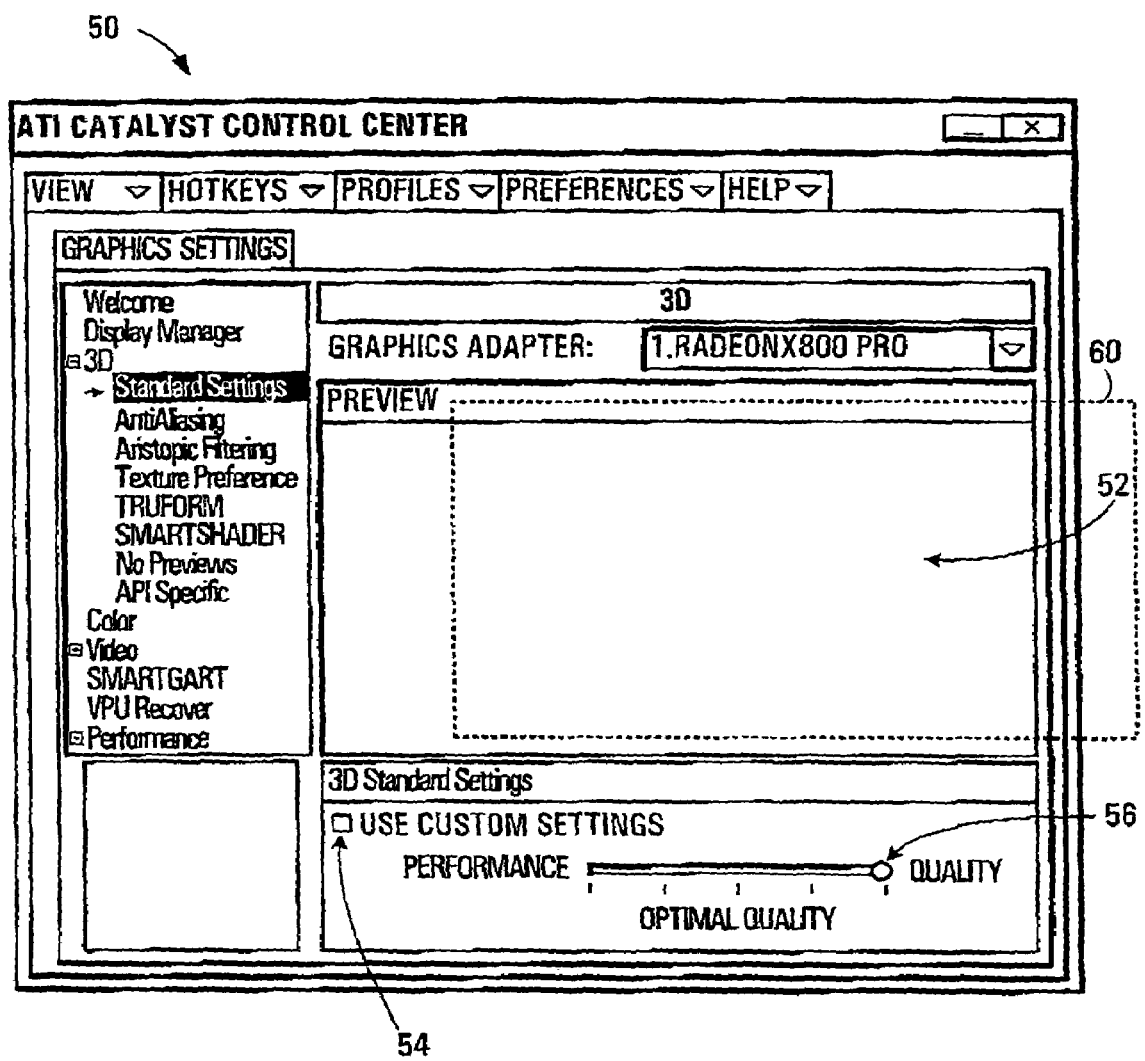
FIGS. 5A-5H are representations of a graphical user interface of software used to configure driver parameter settings in the device of FIG. 1, exemplary of an embodiment of the present invention
Figure 5B:
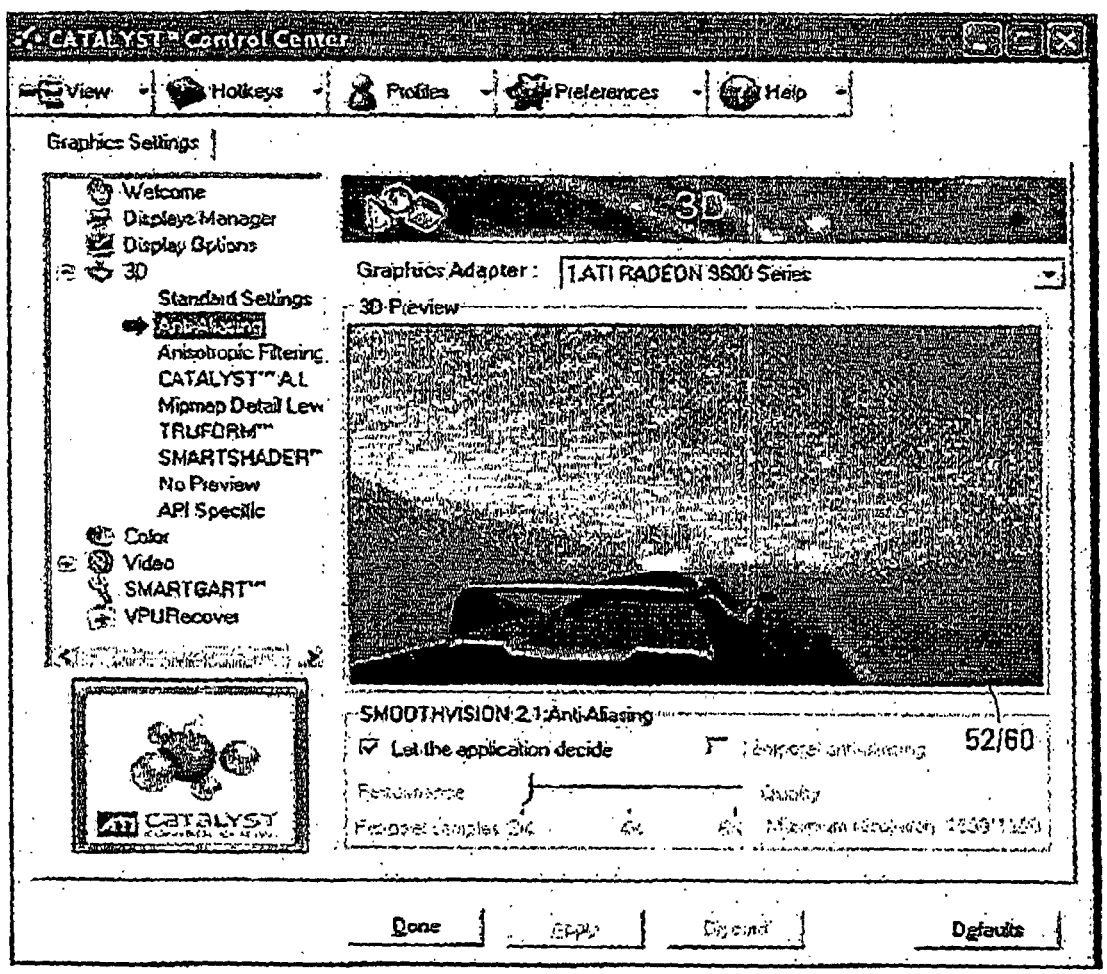
Figure 5C:
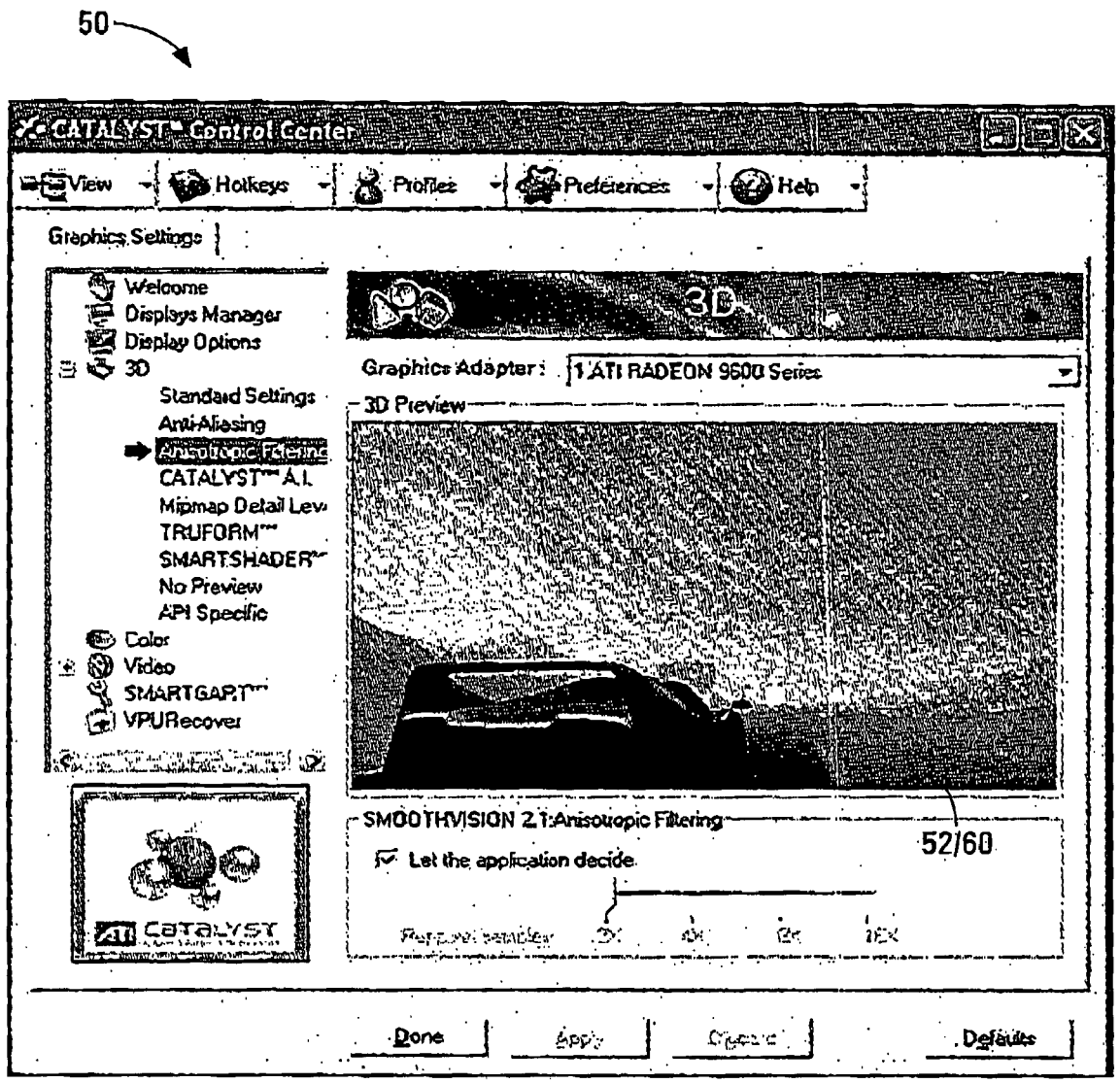
Figure 5D:
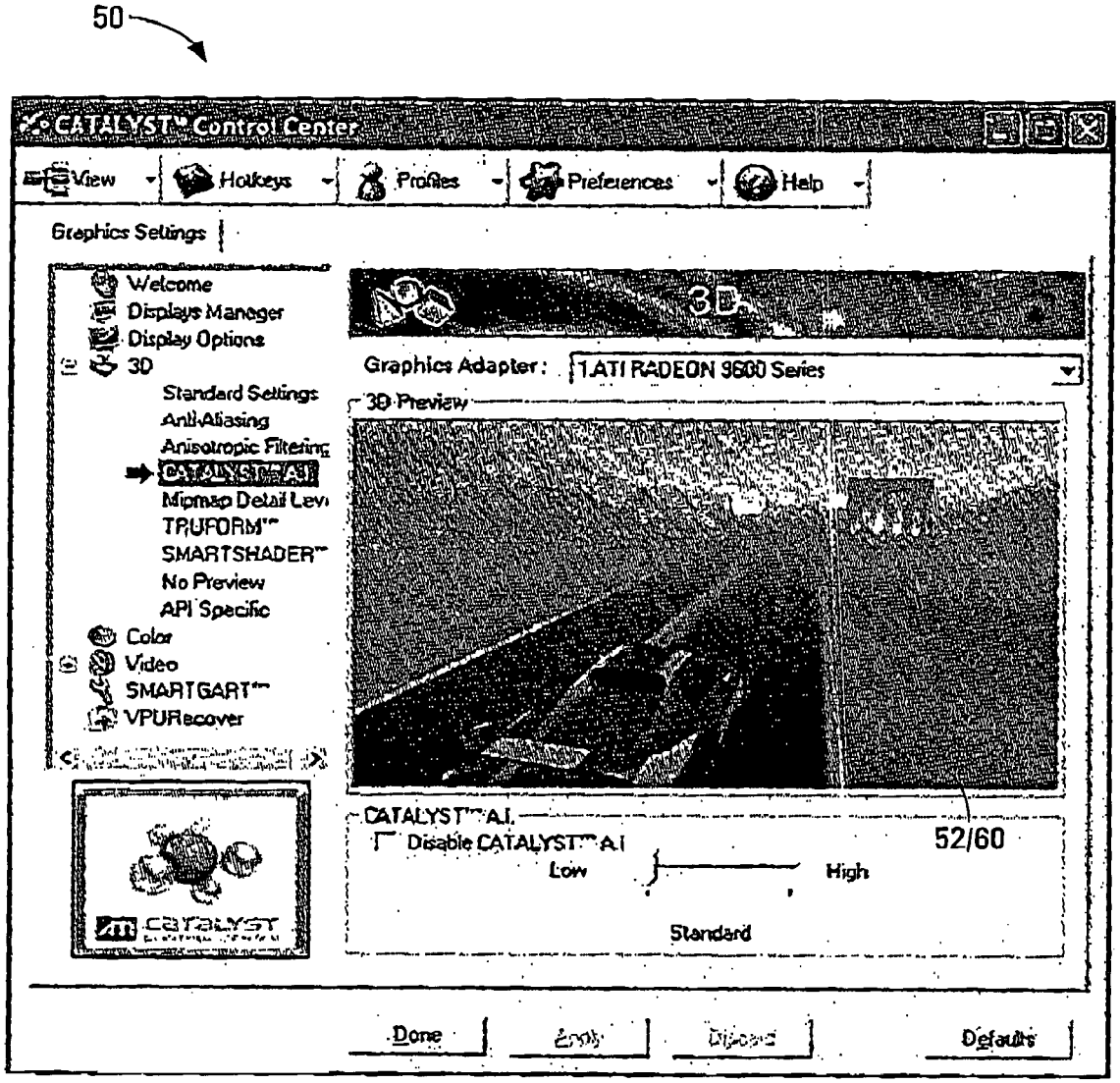
Figure 5E:
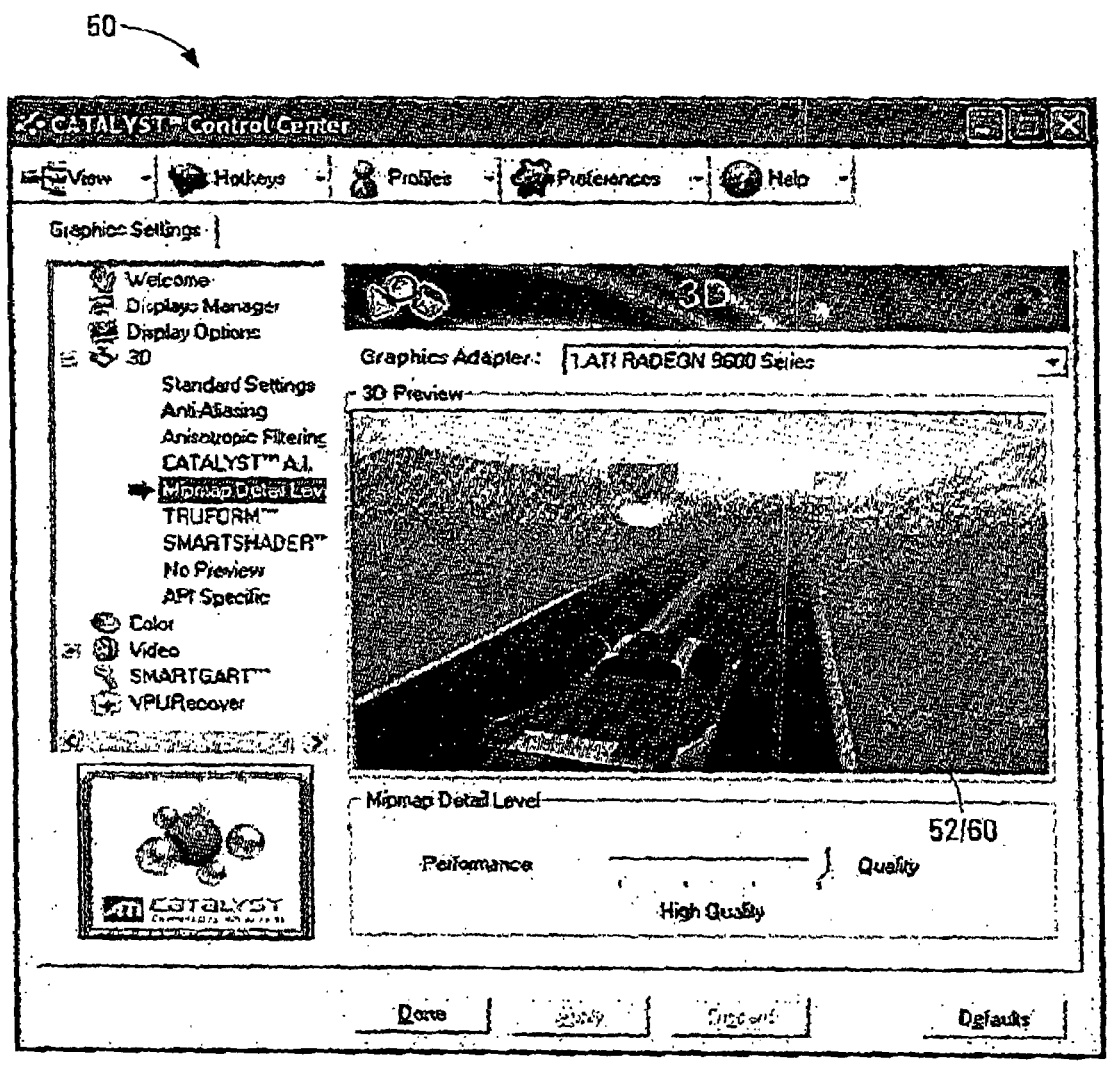
Figure 5F:
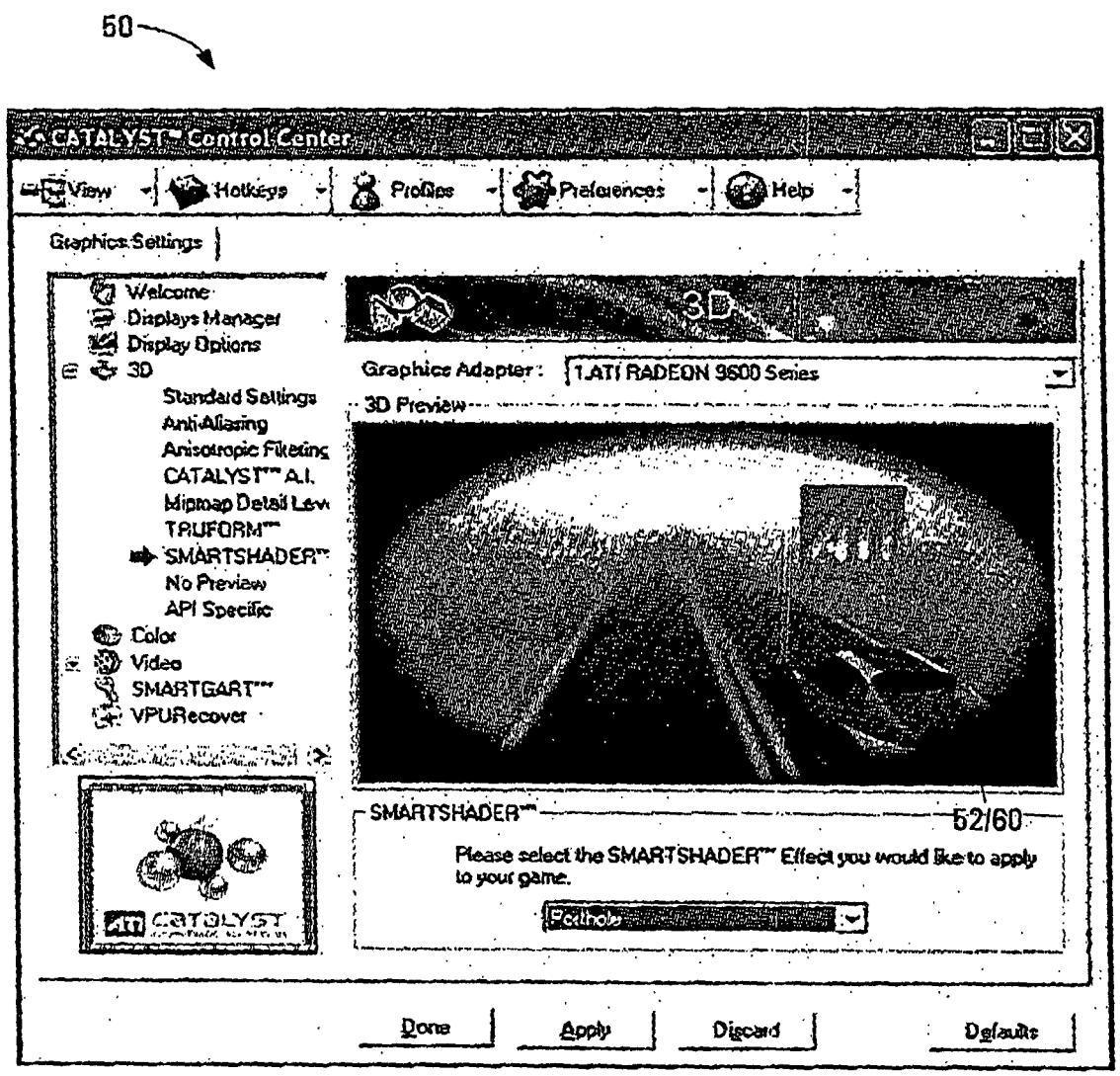
Figure 5G:
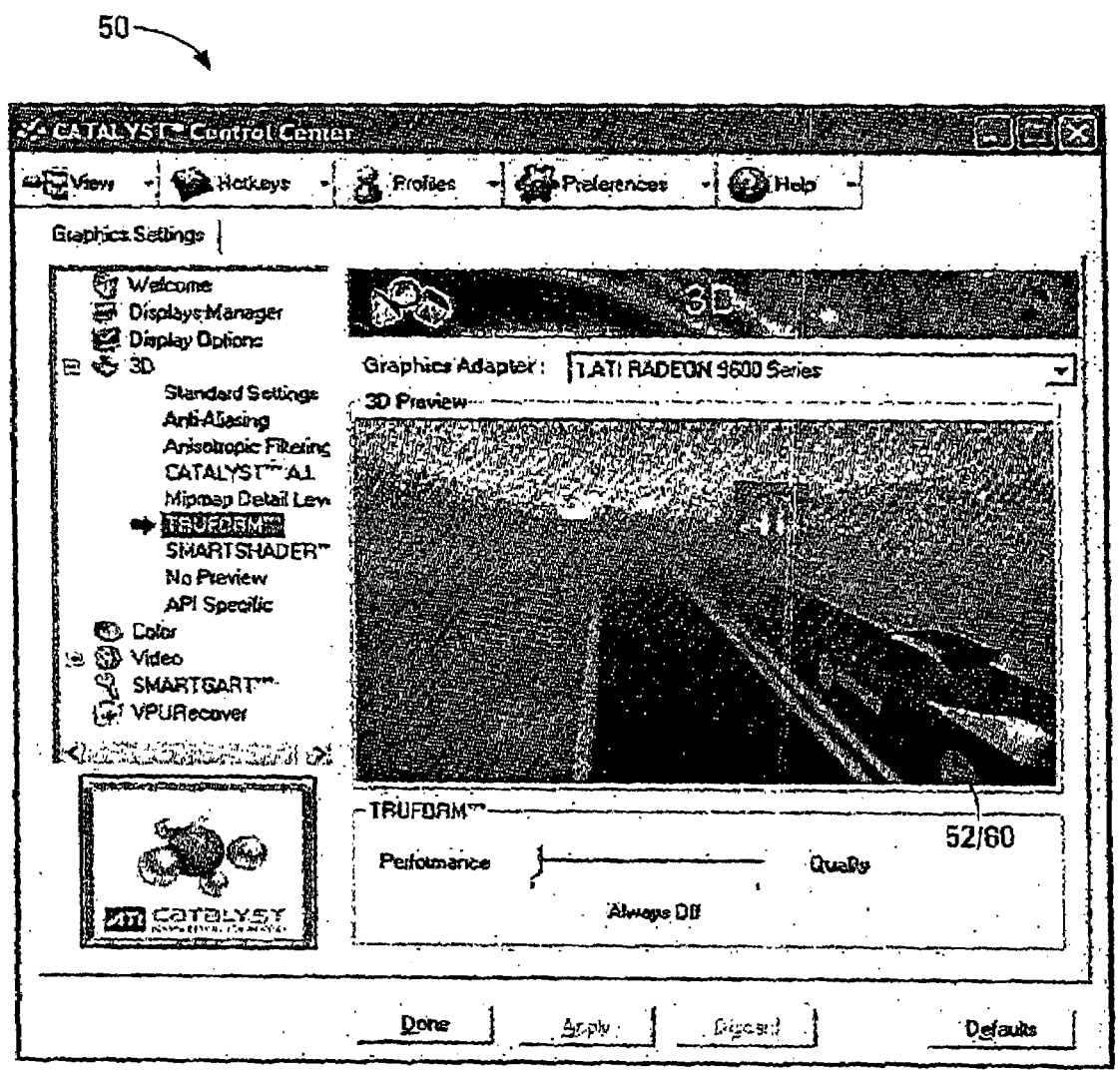
Figure 5H:
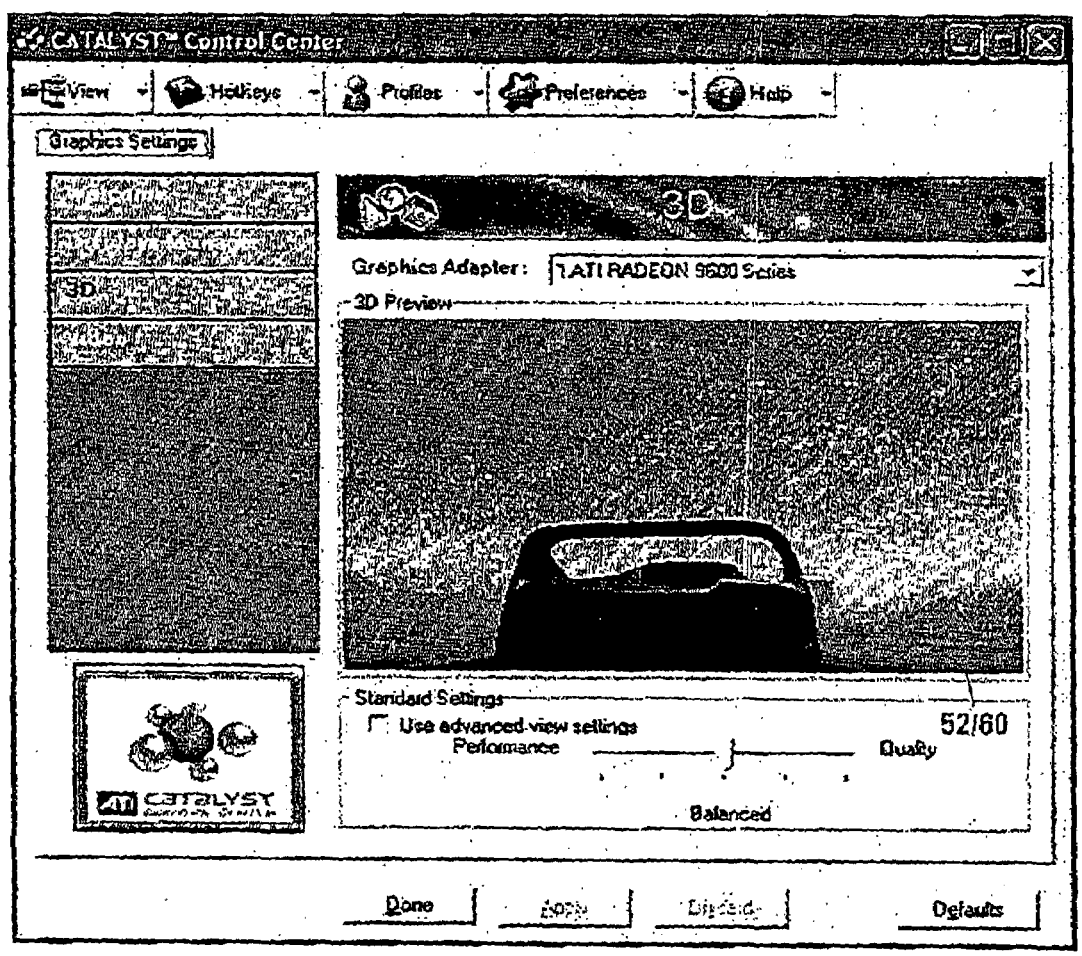

Now, a user may interact with application window 50 in a conventional manner, and provide user input to application window 50 used to vary driver settings by using an input device, such as the keyboard 22 or mouse, to change graphical user interface controls of application window 50. For example, tick box 54 may be set, slider 56 may be moved, or the like. Software blocks executed at preview application 104, responds as outlined in FIG. 4. As illustrated, preview application 104 is notified by the operating system 116 of the event changing the graphical user control in program block S402.

Upon receipt of the event notification, in block S402, preview application 104, updates driver parameter values to reflect the changed settings in block S406. Existing driver parameter settings are temporarily stored in memory in block S404. Specifically, values stored within the registry are changed to reflect the changed parameter settings. As some of these settings cannot be written to by an application, such as preview application 104, running in user mode, preview application 104 calls a kernel mode graphics module, such as GDI library 112 to change those registry settings.

After updated driver parameters are stored within the registry, a new application is again spawned in block S408. This new application creates second preview region 60 (drawn as a window/surface in shadow in FIG. 5A), to be used in place of first preview region 52. Again, the OpenGL library 114 is used. Because a new application is spawned, an instance of the OpenGL library 114 is again created as soon as the new application uses the library to draw a surface. All driver parameter settings as they exist when the OpenGL library 114 is instantiated are read or inherited. In the depicted embodiment, a new device context is created in block S416 and preview region 60 (or window/surface) is drawn using the OpenGL library 114 in block S416. Specifically, the coordinates of application window 50 are again used to draw the new second preview region 60, in the exact location of first preview region 52 in block S418. Conveniently, as the OpenGL library 114 reads the newly stored driver parameter settings, driver parameter changes applied in block S406 are recognized and the newly created second preview region 60 will be drawn in block S412 reflecting the changed settings. In block S418, the second preview region 60 may also be made visible. The second preview region 60 may be made visible through an OpenGL function call (such as previewWindow.Visible=true). Alternatively, the second preview region 60 may be created under existing first preview region 52 (in z-space). The first preview region 52 would thus be on top of the second preview region 60. Destruction of the context for first preview region 52 and the first preview region 52 as detailed below would thus make the second preview region 60 visible.

Once the second preview region 60 is drawn, the newly spawned application sends a message in block S420 indicating that the second preview window has been successfully drawn and the context for the existing preview region 60 may be destroyed, and the newly drawn region 60 may be made visible. This can be effected in numerous ways. For example, in response to receiving the message generated in step S420 in step S410, the context for the window defining the first preview region may be destroyed in block S412. Alternatively or additionally, the application used to create first preview region 52 may be killed in step S412. Of course, the application used to create the first preview region 52 could be killed before creation of the second preview region. The remainder of application window 50 or windows therein need not be redrawn, replaced or the like.

Although a new second preview region 60, in the form of a window, is created to replace first preview region 52, in response to changes made to the driver parameter settings, the changes to the settings appear transparent to the end user. Relevant information about the state of region 52 may be used to draw second preview region 60 after creation of the context for the second region 60 in block S410 to provide a seamless transition to the new driver parameters. Specifically, the application creating first preview region 52 may be queried, to determine the "model time". The second preview then starts the model at the "model time" it is to begin at. As will be appreciated, the model time is an input parameter to models that generate the 3D scene. For example, animated content may be presented within regions 52 and 60. A 3-D animation library such as those provided by Maya or the ID (Quake3) engine may be called to draw content Within preview regions 52 and 60. Parameters making subsequent drawings appear contiguous in time and space may be passed to the 3-D library, causing region 60 to display the same portion of the animation as region 52, providing a seamless transition to the newly previewed display settings. An end user would thus not be aware that a new window has been instantiated because it would appear as if the changes to the driver parameters were made in real time upon the preview window.

After second preview region 60 is drawn, stored driver parameter settings are restored in block S414, so that other applications (in particular new applications using OpenGL) are not affected by driver parameter changes.

Once driver parameter settings are previewed, more preview setting events may be received in block S402 and onwards. Now, the second preview region 60 may be treated as the first, and additional (second) preview windows may be created, as detailed above. After settings are satisfactory to the user, a further event signifying the acceptance of the settings may be provided to preview application 104. For instance, an APPLY button within application window 50 may be pressed by the user, and this press may be communicated to preview application 104. Changed driver parameter settings may then be committed to the Windows™ registry, and a driver mode change may be forced, using operating system calls such as, for example, the Windows™ User32API.ChangeDisplaySettingsEx call.

In an alternate embodiment, application software 102 (FIG. 2) may further include a driver state control application 106 running in user mode to ease the ability to manipulate settings of the display driver 126. State control application 106 stores all driver settings and makes necessary calls libraries to change driver parameter settings. All changes to display driver parameter settings may thus be made through the state control application 106.

As will now be appreciated, although preview regions 52 and 60 have been described as windows/surfaces contained within application window 50, regions 52 and 60 could be redrawn elsewhere, as separate windows/surfaces or on other physical displays.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of graphically previewing changes to hardware driver parameters in a graphical computing environment, said method comprising:
   forcing an executable graphics program module to load hardware driver parameter settings;
   drawing a first preview region using said executable graphics program module in a window on a display;
   receiving user input indicating changes to said hardware driver parameter settings from initial settings to changed settings;
   altering said hardware driver parameter settings to reflect said changed settings;
   creating a further instance of said executable graphics program module, and forcing said further instance of said executable graphics program module to load said hardware driver parameter settings as changed;
   drawing a second preview region in place of said first preview region without redrawing the remainder of said window, using said further instance of said executable graphics program module and said hardware driver parameter settings as changed, said second preview region reflective of said changed settings and thereby graphically previewing said changed settings in said second preview region in said window;
   altering said hardware driver parameter settings to said initial settings, after said drawing a second preview region, so that other applications are unaffected by said changed settings to said hardware driver parameter settings.

2. The method of claim 1, wherein said second preview region and said first preview region are drawn on top of each other.

3. The method of claim 2, wherein said second preview region when created, is hidden, and further comprising revealing said second preview region to preview said hardware driver parameters as changed.

4. The method of claim 1, further comprising drawing an application window for receiving said user input.

5. The method of claim 4, wherein said first and second preview regions comprise regions drawn within said application window.

6. The method of claim 4, further comprising creating data structures used to create said first and second preview regions.

7. The method of claim 6, wherein said revealing said second preview region comprises destroying said data structure used to draw said first preview region.

8. The method of claim 1, wherein said driver parameters include parameter affecting at least one of anti-isotropic filtering; texture mapping; shading; brightness settings; and texture rendering detail.

9. The method of claim 1, wherein said executable graphics program module is a dynamically linked library.

10. The method of claim 9, wherein said forcing said instance of said executable graphics program module comprises instantiating said dynamically linked library.

11. The method of claim 10, wherein said dynamically linked library is the OpenGL library.

12. The method of claim 11, further comprising spawning a process in order to create said further instance of said executable graphics program module, and force said further instance to load said hardware parameter settings as changed.

13. The method of claim 12, further comprising executing an operating system, and wherein said altering comprises saving driver settings in a registry used by said operating system.

14. The method of claim 13, wherein said operating system comprises a Microsoft Windows™ operating system.

15. The method of claim 1, wherein said altering said hardware driver parameter settings to said initial settings is performed after receiving notification that said second preview region has been drawn.

16. Computer readable medium storing computer software that when loaded at a computing device, adapt said computing device to graphically preview changes to hardware driver parameters in a graphical computing environment, by:

forcing an executable graphics program module to load hardware driver parameter settings;

drawing a first preview region using said executable graphics program module in a window on a display;

receiving user input indicating changes to said hardware driver parameter settings from initial settings to changed settings;

altering said hardware driver parameter settings to reflect said changed settings;

creating a further instance of said executable graphics program module, and forcing said further instance of said executable graphics program module to load said hardware parameter settings as changed;

drawing a second preview region in place of said first preview region without redrawing the remainder of said window, using said further instance of said executable graphics program module and said hardware driver parameter settings as changed, said second preview region reflective of said changed settings and thereby graphically previewing said changed settings in said second preview region in said window altering said hardware driver parameter settings to said initial settings, after said drawing a second preview region, so that other applications are unaffected by said changed settings to said hardware driver parameter settings.

* * * * *

UNITED STATES PATENT AND TRADEMARK OFFICE
CERTIFICATE OF CORRECTION

PATENT NO. : 7,636,921 B2  Page 1 of 1
APPLICATION NO. : 10/930826
DATED : December 22, 2009
INVENTOR(S) : Wayne C. Louie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Twenty-first Day of December, 2010

David J. Kappos
*Director of the United States Patent and Trademark Office*